United States Patent [19]
Kockler

[11] 3,947,022
[45] Mar. 30, 1976

[54] SELF-ALIGNING PINCH ROLL FOR MAGNETIC CARD TRANSPORT SYSTEM

[75] Inventor: Barry C. Kockler, Lewisville, Tex.

[73] Assignee: Xerox Corporation, Stamford, Conn.

[22] Filed: Oct. 7, 1974

[21] Appl. No.: 512,581

[52] U.S. Cl. ............... 271/250; 226/180; 226/194; 271/274; 271/DIG. 9
[51] Int. Cl.² ..................... B65H 9/04; B65H 5/06
[58] Field of Search .......... 271/3, DIG. 9, 243, 250, 271/251, 274, 273, 272, 80; 198/167; 226/180, 194, 191, 192, 179, 177

[56] References Cited
UNITED STATES PATENTS

| | | | |
|---|---|---|---|
| 2,535,234 | 12/1950 | Schwartz | 226/177 X |
| 3,438,558 | 4/1969 | Hammond | 226/194 X |
| 3,704,360 | 11/1972 | McFadden | 271/DIG. 9 |

Primary Examiner—Evon C. Blunk
Assistant Examiner—Bruce H. Stoner, Jr.

[57] ABSTRACT

A magnetic card transport system for an electronic typewriter comprises a reversible drive roll and a co-acting pinch roll which form a nip through which a magnetic card is passed. The drive roll and pinch roll coact to move the card in opposite directions. Guide means are provided which is engaged by one longitudinal edge of the card, and spring means are provided which engage the other longitudinal edge of the card to urge the card into engagement with the guide means for registration purposes. The pinch roll is mounted in such a manner that it may freely oscillate. The oscillation is such that the pinch roll axis pivots in each direction from a line substantially perpendicular to the guide means between ½° and 3° about a vertical axis normal to its axis of rotation to allow for self-alignment to maintain the card in alignment with the guide means. With this construction, manufacturing tolerances of the pinch roll assembly for alignment are not as critical when the roll is not free to rotate about a vertical axis to self-align.

6 Claims, 6 Drawing Figures

SELF-ALIGNING PINCH ROLL FOR MAGNETIC CARD TRANSPORT SYSTEM

DESCRIPTION OF THE INVENTION

This application is related to copending U.S. application Ser. No. 512,578, filed concurrently herewith, U.S. application Ser. No. 522,662, filed Nov. 11, 1974, and U.S. application Ser. No. 537,794, filed Dec. 30, 1974, each of which are commonly assigned.

This invention concerns a magnetic card transport subsystem for an electronic typewriter.

It is an object of this invention to provide a simple and efficient card transport system. It is proposed to achieve this object by providing a drive roll and pinch roll which coact to alternately drive a magnetic card in a forward direction past a magnetic head for a read or write function and then in the opposite return direction while the magnetic head changes tracks to perform the read or write function when the magnetic card makes its next forward pass.

It is a further object of this invention to provide a self-aligning pinch roll which allows the same pinch roll and drive roll to alternately move the magnetic card in opposite directions while maintaining the card in registered alignment during such movement.

Other objects of this invention will become apparent from the following description with reference to the drawings wherein.

Figure 1:
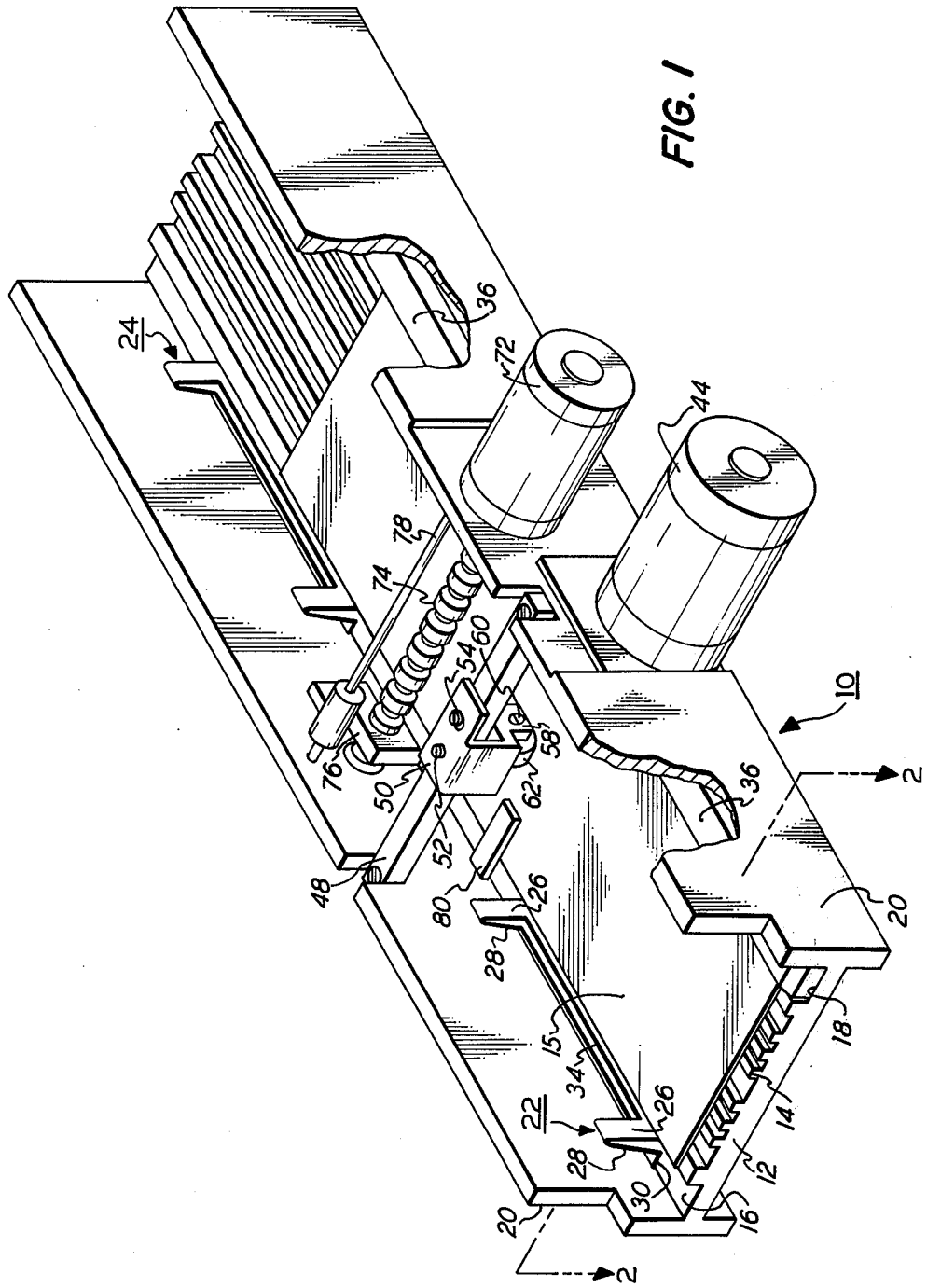
FIG. 1 is a perspective view of a card transport system.
Figure 2:
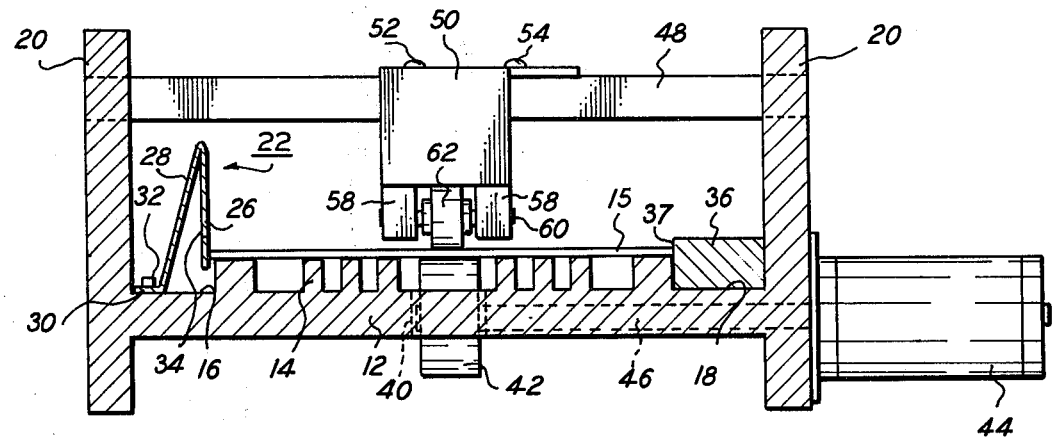
FIG. 2 is a view taken along section line 2—2 of FIG. 1.

Referring to FIG. 1, there is illustrated a card transport subsystem of an electronic typewriter system which comprises a frame 10. The frame 10 comprises a card support platform 12 having a plurality of ribs 14 for supporting a magnetic card 15. One longitudinal edge of the platform is defined by a groove 16 and the other longitudinal edge of the platform is defined by a groove 16. Projecting above the platform 12 adjacent the grooves 16 and 18 are support walls 20. Positioned in the groove 16 are a pair of resilient leaf springs 22 and 24 each of which has two U-shaped sections 26 and 28 connected to each other at the free ends of the legs of the U. The closed end 30 of section 28 is flat and is located in the groove 16 and is secured by screws 32 to the platform 12. The closed end 34 of section 26 is flat and lies in a plane which is approximately normal to the platform with the bottom edge thereof extending below the ribs 14 into the groove 16. The spring is so constructed that section 26 is biased away from section 28.

A guide bar 36 is located in the groove 18 and secured to the platform 12. The guide bar extends substantially above the ribs 14 to provide a guide surface 37 thereabove for a longitudinal edge of the card 15. An opening 40 is provided in the platform 12 and receives a portion of a resilient drive roll 42 therein which is so located that a plane tangential to the periphery of the roll portion extending through the opening 40 will be substantially coincident with the plane of the top of the ribs 14 to prevent possible deformation of or lifting of the card 15 when the card is driven by the drive roll 42. A D.C. motor 44 is secured to one wall 20 and has a drive shaft 46 operably connected to the drive roll 42 by any well-known means to alternately drive the roll 42 in opposite directions.

Figure 3:
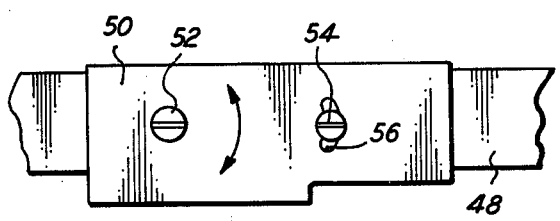
FIG. 3 is a plan view of a support bracket for a pinch roll.

A support bar 48 is secured to the walls 20 and a pinch roll support bracket 50 is secured to the bar 48 by a pair of screws 52 and 54 (see FIG. 3). Screw 52 extends through an opening in the bracket which is approximately the same diameter as the screw and screw 54 extends through an oversized opening 56 which allows the bracket 50 to be adjusted by pivoting about screw 52 when both screws 52 and 54 are loosened. The bracket 50 includes a pair of roll supporting legs 58. A shaft 60 extends through a pinch roll 62 and each end thereof is located in an elongated cavity 64 in each leg 58. The portion of the shaft 60 extending into the cavities 64 have a flat surface 66 and the upper portion of each cavity has a counterbore 68. A coil spring 70 is located in each cavity and has one end resting on the flat 66 and the other end thereof positioned in the counterbore 68. In this position, the coil spring is in compression and urges the shaft 60 against the bottom of the cavity 64. The pinch roll 62 freely rotates about the shaft 60. The width "W" of the cavity is larger than corresponding dimension $d$ of the shaft by an amount which allows for slight pivoting of the shaft 60 and thereby the roller about a vertical axis normal to the shaft of the magnitude of 1° to 6° for a purpose to be described later. For instance, the width W of the cavity may be 0.102 inch while the dimension $d$ of the shaft may be 0.092 inch.

The bar is located on the walls 20 in such a manner that the periphery of the pinch roll 62 will be spaced from the drive roll 42 by less than thickness of the card 15 when the shaft 60 is pressed against the bottom of the cavities 64 by the spring 70. For instance, the spacing may be on the order of 0.003 inch while the thickness of the card is 0.008 inch. This is to prevent contact between the two rolls when the machine is not in use to avoid producing depressions in the resilient drive roll 42 since any depression in the drive roll will cause a jerky motion affecting reading the card or writing on the card or subsequent correlation of the two functions.

The axial width of the pinch wheel 62 at its axis of rotation is smaller than the space between the legs 58 by an amount sufficient to permit the wheel to visually shift from side to side upon change in direction of rotation when the pinch roll is out of alignment. For instance, the width of the pinch roll at its axis of rotation can be 0.250 inch while the space between the legs can be 0.312 inch thereby allowing shifting of 0.062 inch. This feature is built into this mechanism to allow one to adjust the pinch roll to align the same with the guide surface so it has the ability to effect, by pivoting, a resulant driving force vector of the drive roll and pinch roll in a direction which is substantially parallel to the guide surface 37. To effect such alignment of the pinch roll 62 with the guide surface, a card is moved in reverse directions between the pinch roll 62 and drive roll 42 by reversing rotation of the rolls. When the pinch roll is out of alignment, the pinch roll 62 will shift axially upon each reversal of rotation. The person adjusting the pinch roll position observes this and adjusts the position of the pinch roll until such shifting stops which indicates the freely pivoting pinch roll is in alignment. When positioned in alignment, the pinch roll will be free to oscillate such that the axis thereof pivots between about ½° to 3° in each direction from a line which is substantially perpendicular to the guide surface 37. Adjustment is effected by pivoting the bracket 50 about pivot screw 52 and then tightening screw 54 to lock the bracket in place. In this case, the manufacturing tolerances of various elements of the transport system are of such nature that permitting the pinch roll to freely rotate about a vertical axis between about 1° and 6°, the pinch roll will automatically compensate for any misalignment due to such tolerances so the resultant driving force vector of the drive roll and pinch roll will be substantially parallel to the guide surface 37.

The significance of allowing the pinch roll 62 to freely rotate such that the axis thereof pivots at least ½° in either direction from a line substantially perpendicular to the guide surface 37 can be seen when comparing the same to a fixed pinch roll, the axis of which is in a position not perpendicular to the guide rail by a slight rotation in a counterclockwise direction (FIG. 1). During forward movement of the card, the driving force vector between the drive roll and pinch roll will drive the card in a skewed direction away from the guide rail 36 toward the spring 24. When the card moves in the reverse direction, the force vector between the pinch roll and drive roll is toward the guide rail which does not cause the above problem. If the fixed pinch roll is in a position out of line with the guide rail by a slight rotation in a clockwise direction (FIG. 1), then the same problem occurs in the card reverse movement rather than in the card forward movement. Thus, with a roller fixed against free angular alignment, manufacturing tolerances must be very tight or the above problem will occur when the same drive roller and pinch roll are used for moving a card in reverse directions. These tight tolerances may in some instances be impractical to hold. One obvious alternative method to overcome the above problem would be to design the spring 24 to have a force to overcome the continuous frictional contact between the card and pinch roll 62 to continuously keep the card against the guide rail. However, this will create a higher frictional contact against the guide rail increasing the resistance to forward movement of the card. To overcome this resistance, a stronger motor is needed to drive roll 42 which increases the skew driving force. Thus, this becomes quite a design problem which is eliminated by allowing the pinch roll to freely rotate such that the axis thereof pivots about a vertical axis at least ½° in either direction from a line substantially perpendicular to the guide surface 37 so the resultant driving force vector between the pinch roll and drive roll is substantially parallel to the guide surface 37. The pivoting movement of the pinch roll is limited such that the axis thereof pivots not more than about 3° in each direction from a line which is substantially perpendicular to the guide surface 37 since any movement greater than that angle tends to skew the pinch roll too much in one direction. Too much skew decreases the possibility that the pinch roll can change angles on the reverse movement of the card and that the card will move in the reverse direction thus reducing the reliability of the system.

A step motor 72 is connected to one of the walls 20 and a worm gear 74 extends therefrom across the platform and is journalled into the other wall. A magnetic head 76 is operatively secured to a guide rod 78 and to the worm gear 74 for stepped slidable movement across the platform 12. A light emitting diode (LED) detector 80 is located to detect the leading edge of the card which then actuates a control circuit. The control circuit is designed to place the magnetic head 76 and the motor 44 into a read or write condition depending upon the function selected by an operator. In the write condition, an operator types one line of information into a buffer system to store the information. When the operator hits the carriage return button, the motor 44 is actuated to rotate the drive roll 42 to drive the card 15 forwards and simultaneously bits of information are fed from the buffer to the magnetic head 76 and recorded on the card. After one line of information is recorded, the motor 44 is reversed to reverse rotation of the drive roll 42 and thereby move the card in the reverse direction while simultaneously motor 72 is actuated to move the magnetic head 76 transversely to the next track. The same procedure is followed after the operator types the next line and pushes the carriage return button. In the read condition, the motor 44 is continuously actuated to alternately move the card 15 in opposite directions. The magnetic head reads a track of bits during forward movement of the card 15 therepast and the card 15 is moved in the reverse direction while the magnetic head is moved transversely to the next track by motor 72. A sheet of paper is typed automatically in accordance with the bits of information on the card 15 during reading thereof.

Figure 4:
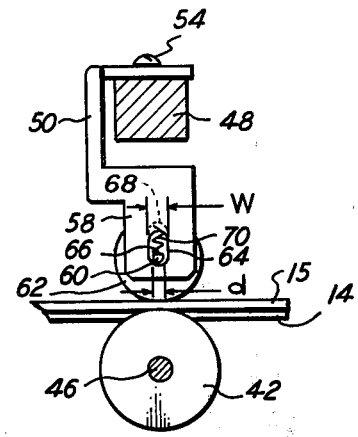
FIG. 4 is a section view of a pinch roll support shown in FIG. 1.

In operaton, the card 15 is placed onto the platform 12. As the leading edge thereof slides past the LED 80, the control circuits are readied for activation and further movement of the card brings the leading edge thereof to the nip between the rolls 42 and 62 raising the pinch roll 62 against the springs 70 to accommodate the thickness of the card. The strength of the springs 70 is such that the card is pressed against the drive roll 42 to maintain sufficient friction therebetween to drive the card. Since one end of the shaft 60 can move vertically relatively to the other end, the pinch roll aligns itself for full axial contact with the card 15. When the motor 44 is activated either by depressing a carriage return button or by depressing the appropriate button for readng the card, the drive roll is rotated in a clockwise direction (FIG. 4) to drive the card forwards. The side edge of the card engages leaf spring 22 which exerts a force on the card to urge the opposite edge thereof against the guide rail 36 to maintain registration for reading and writing functions. Since the pinch roll 62 is allowed to pivot relative to its support bracket 58 such that its axis pivots at least ½° in each direction from a line substantially perpendicular to the guide surface 37, the card meets no resistance from the pinch roll when it is urged toward the guide rail by the spring 22. When the card is urged toward the guide rail, the card pivots the pinch roll until the resultant driving force vector between the pinch roll and drive roll is substantially parallel to the guide surface 37. As the card continues its forward movement, it moves under the magnetic head for either the printing or reading function and engages the spring 24 which in conjunction with spring 22 urges the card toward the guide rail. After the card has moved forward to receive a certain quantity of data bits from the magnetic head or a certain quantity of data bits have been read by the magnetic head, the control circuit will act to reverse the motor 44 to reverse the rotation of the drive wheel 42 and thereby move the card rearwards to its next read or write position. At the same time, step motor 72 is activated to transversely move the magnetic head 76 to the next track.

Figure 5:
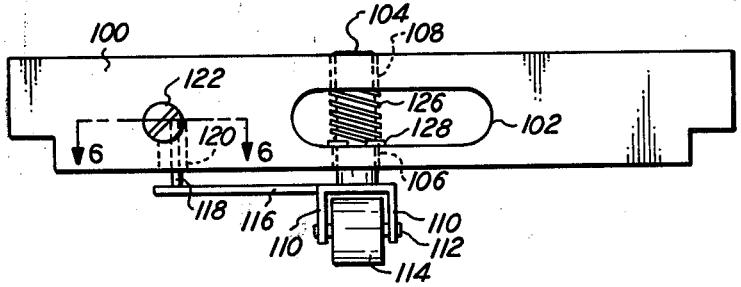
FIG. 5 is a view similar to that of FIG. 2 only illustrating just a pinch roll and a modified support therefor.
Figure 6:
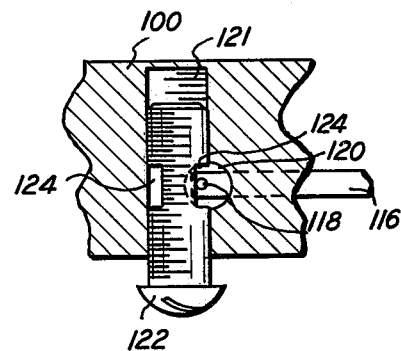
FIG. 6 is a view taken along section line 6—6 of FIG. 5.

A modification of the pinch roll support which retains the same self-aligning concept of FIG. 1 is shown in FIG. 5. A support bracket 100 is attached to the walls 20 and has a large central opening 102 therein. A shaft 104 extends through spaced bores 106 and 108 and terminates at the lower end thereof in a pair of spaced legs 110 receiving an axle 112 therebetween about which a pinch roll 114 rotates. An arm 116 extends from the bottom of the shaft 104 and has a vertical pin 118 attached thereto at one end which extends into an oversized bore 120 in the bracket 100. A threaded screw 122 is located in a cross bore 121 which intercepts bore 120. The screw has an oversized annular groove 124 which receives the upper portion of the pin 118 therein. There is enough clearance (about 0.008 inch) between the walls of the groove and the pin to allow lateral shifting of the pin to cause rotation of the shaft 104 and thereby the roll 114 about a vertical axis from 1° to about 6°. A coil spring 126 surrounds the shaft 104 and has one end engaging the surface of bracket 100 surrounding bore 108 and the other end engaging a snap ring 128 secured in an annular groove in the shaft 104. The spring 126 is in compression and biases the shaft 104 downwards until the snap ring 128 engages the bracket surface surrounding bore 106. The bracket 100 is secured to the walls 20 in such a manner that there is a slight space between the pinch roll 114 and the drive roll 42. Initial alignment of the pinch roll 114 with the guide member 36 is effected by rotating the screw 122 to shift the pin 118 to rotate shaft 108. When a card is inserted into the nip between the pinch roll 114 and drive roll 42, the pinch roll 114 is moved vertically relative to the bracket 100 against the force of the spring 126 to accommodate the thickness of the card. The spring 126 maintains sufficient pressure on the card 15 to effect a sufficient friction driving force between the card and drive roller 42.

What is claimed is:

1. A card transport system comprising a card support member having a top surface, stationary guide means extending along one longitudinal edge of said support member and extending above said top surface, resilient means extending along the other longitudinal edge of said support member opposite said guide means, said resilient means being so constructed and arranged to apply a force in a direction generally perpendicular to the guide means and generally parallel to said top surface, an opening in said member extending through said top surface, a drive roll supported for rotation about an axis which is generally parallel to said top surface and having a portion thereof extending into said opening with a plane tangent to the periphery thereof being substantially coplaner with said top surface, means for driving said roll in opposite directions, a rotatable pinch roll located above said top surface opposite said drive roll and forming a card receiving nip with said drive roll, resilient means urging said pinch roll towards said drive roll, and means loosely mounting said pinch roll for pivotal movement thereof so that its axis pivots between about ½° and 3° relative to said support member in opposite directions from a line substantially perpendicular to said guide means about a vertical axis substantially normal to its axis of rotation and substantially normal to said top surface.

2. The structure as recited in claim 1 further comprising means for limiting movement of said pinch roll toward said drive roll so that said pinch roll is slightly spaced from said drive roll.

3. The structure as recited in claim 1 wherein pinch roll support means is connected to said card support member, a vertical shaft rotatably connected to said pinch roll support means and coincident with said vertical axis, a pair of spaced members extending from the lower end of said vertical shaft, a transverse shaft extending between and carried by said spaced members, said pinch roll being rotatably mounted on said transverse shaft, a transversely extending arm operatively connected to said vertical shaft for rotating the same, means operatively connected to said arm for moving the same to rotate said shaft, the operable connection between said arm and said last named means being a lost motion connection to allow relative movement therebetween to effect said pivotal movement of said pinch roll so that its axis pivots between about ½° and 3° in opposite directions from a line substantially perpendicular to said guide means about said vertical axis.

4. The structure as recited in claim 3 wherein said operable connection between said last named means and said arm comprises a pin extending vertically upwards from said arm into said pinch roll support means, a member threadedly connected to said pinch roll support means and extending transversely to said pin, said threaded member having spaced apart annular shoulders defining an annular groove therebetween, said pin extending into said groove to be engaged by said shoulders upon rotation of said threaded member, the spacing between said shoulders being larger than the correspondng dimension of said pin to form said lost motion connection therebetween.

5. The structure as recited in claim 4 wherein said pinch roll support means includes an opening having vertically spaced apart shoulders, said vertical shaft extending through said opening past said shoulders, spring support means extendng transversely from said vertical shaft, said last named resilient means comprising a coil spring surrounding said shaft and having one end operatively connected to one of said shoulders and the other end operatively connected to said spring support means on said vertical shaft to bias said shaft in a downward direction.

6. The structure as recited in claim 5 wherein said spring is compressed between the upper one of said shoulders and said spring support means.

* * * * *